(12) United States Patent
Ziminsky et al.

(10) Patent No.: US 7,181,916 B2
(45) Date of Patent: Feb. 27, 2007

(54) METHOD FOR OPERATING A REDUCED CENTER BURNER IN MULTI-BURNER COMBUSTOR

(75) Inventors: Willy Steve Ziminsky, Simpsonville, SC (US); Derrick W. Simons, Greer, SC (US); Arthur James Fossum, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/513,204

(22) Filed: Aug. 31, 2006

(65) Prior Publication Data

US 2006/0288706 A1 Dec. 28, 2006

Related U.S. Application Data

(62) Division of application No. 10/821,975, filed on Apr. 12, 2004.

(51) Int. Cl.
*F02C 7/26* (2006.01)

(52) U.S. Cl. .............................. 60/776; 60/778; 60/790

(58) Field of Classification Search ............. 60/39.465, 60/737, 746, 747, 749, 776, 778, 790
See application file for complete search history.

(56) References Cited

U.S. PATENT DOCUMENTS

| | | | |
|---|---|---|---|
| 4,196,173 A | 4/1980 | deJong et al. | |
| 4,233,274 A | 11/1980 | Allgulin | |
| 4,273,747 A | 6/1981 | Rasmussen | |
| 4,814,152 A | 3/1989 | Yan | |
| 4,843,102 A | 6/1989 | Horton | |
| 5,054,280 A * | 10/1991 | Ishibashi et al. | 60/776 |
| 5,141,724 A | 8/1992 | Audeh et al. | |
| 5,409,522 A | 4/1995 | Durham et al. | |
| 5,413,477 A | 5/1995 | Moreland | |
| 5,572,938 A | 11/1996 | Leger | |
| 5,695,726 A | 12/1997 | Lerner | |
| 5,787,823 A | 8/1998 | Knowles | |
| 5,901,555 A | 5/1999 | Mandai et al. | |
| 5,924,275 A * | 7/1999 | Cohen et al. | 60/778 |
| 6,027,551 A | 2/2000 | Hwang et al. | |
| 6,047,551 A | 4/2000 | Ishiguro et al. | |

(Continued)

OTHER PUBLICATIONS

"Kinetic Models For Predicting the Behavior Of Mercury In Coal-Fired Power Plants", C. Senior, et al., ACERC Annual Conference, Feb. 19-20, 2003, pp. 1-22.

(Continued)

*Primary Examiner*—L. J. Casaregola
(74) *Attorney, Agent, or Firm*—Nixon & Vanderhye P.C.

(57) ABSTRACT

A method for combustion in a combustor in a gas turbine including: fueling the center fuel nozzle with a fuel-rich mixture of gaseous fuel and air and fueling the outer fuel nozzles with a fuel-lean mixture of fuel and air; igniting the fuel-rich mixture injected by the center fuel nozzle while the fuel-lean mixture injected by the outer combustors is insufficient to sustain ignition; stabilizing a flame on the center fuel nozzle using the bluff body and while the outer fuel nozzles inject the fuel-lean mixture; staging fuel to the outer nozzles by increasing a fuel ratio of the fuel-lean mixture, and after the outer nozzles sustain ignition, reducing fuel applied to the center nozzle.

20 Claims, 5 Drawing Sheets

U.S. PATENT DOCUMENTS

| | | |
|---|---|---|
| 6,206,685 B1 | 3/2001 | Zamansky et al. |
| 6,280,695 B1 | 8/2001 | Lissianski et al. |
| 6,397,602 B2 | 6/2002 | Vandervort et al. |
| 6,451,094 B1 | 9/2002 | Chang et al. |
| 6,471,506 B1 | 10/2002 | Zamansky et al. |
| 6,521,021 B1 | 2/2003 | Pennline et al. |
| 6,558,454 B1 | 5/2003 | Chang et al. |
| 6,595,147 B2 | 7/2003 | Teller et al. |
| 6,604,474 B2 | 8/2003 | Zamansky et al. |
| 6,719,828 B1 | 4/2004 | Lovell et al. |
| 7,003,961 B2 * | 2/2006 | Kendrick et al. ............. 60/776 |
| 2001/0041157 A1 | 11/2001 | Spokoyny |
| 2002/0029690 A1 | 3/2002 | Ridgeway et al. |
| 2002/0095866 A1 | 7/2002 | Hassett |
| 2002/0102189 A1 | 8/2002 | Madden et al. |
| 2002/0166484 A1 | 11/2002 | Zamansky et al. |
| 2002/0170431 A1 | 11/2002 | Chang et al. |
| 2003/0005634 A1 | 1/2003 | Calderon et al. |
| 2003/0009932 A1 | 1/2003 | Kobayashi et al. |
| 2003/0079606 A1 | 5/2003 | Katz |
| 2003/0091490 A1 | 5/2003 | Nolan et al. |
| 2003/0091948 A1 | 5/2003 | Bool, III et al. |
| 2003/0099912 A1 | 5/2003 | Kobayashi et al. |
| 2003/0099913 A1 | 5/2003 | Kobayashi et al. |
| 2003/0104328 A1 | 6/2003 | Kobyashi et al. |
| 2003/0104937 A1 | 6/2003 | Sinha |
| 2003/0108470 A1 | 6/2003 | Spencer et al. |
| 2003/0108833 A1 | 6/2003 | Kobayashi et al. |
| 2003/0110994 A1 | 6/2003 | Lissianski et al. |
| 2003/0143128 A1 | 7/2003 | Lanier et al. |
| 2003/0147793 A1 | 8/2003 | Breen et al. |
| 2003/0154858 A1 | 8/2003 | Kleut et al. |
| 2003/0185718 A1 | 10/2003 | Sellakumar |
| 2004/0011057 A1 | 1/2004 | Huber |

OTHER PUBLICATIONS

"Evaluating The Effects of Low-NOx Retrofits on Carbon In Ash Levels[1]", K.A. Davis, et al. Presented at the Mega Symposium: EPRI-DOE-EPA Combined Utility Air Pollutant Control Symposium, Atlanta, GA, Aug. 1999, pp. 1-15.

"Behavior of Mercury In Air Pollution Control Devices on Coal-Fired Utility Boilers[1]" Constance L. Senior, Prepared For Power Production in the 21st Century: Impacts of Fuel Quality and Operations, Engineering Foundation Conference, Snowbird, UT, Oct. 28-Nov. 2, 2001, pp. 1-17.

"Loss On Ignition In Coal Combustion Simulations", Stefan P. Domino et al., pp. 1-49 (1999).

Reaction Engineering International brochure "Furnace Performance", Reaction Engineering International, printed from REI website on Aug. 22, 2003, pp. 1-2.

"Comparison of Photoacoustic Methods To Loss-On-Ignition and Foam Index Tests In Fly Ash Evaluations", Robert Novack, et al., pp. 1-2 (1997).

"Combustion Optimization Using MPV Systems", Mark Khesin, et al., Pittsburgh Coal Conference, Sep. 2000, pp. 1-4

"Reburn Systems", GE Power Systems, Air Quality Systems & Services, pp. 1-3, GEA-13207 (2001).

"FlamemastEER™ Low $NO_x$ Burners", GEA-13132, p. 1, printed Dec. 2003.

"$NO_x$ Control for Gas Turbines", GE Power Systems, pp. 1-2, printed Dec. 17, 2003.

"$NO_x$ Control for Boilers", GE Power Systems, pp. 1-2, printed Dec. 17, 2003.

"Coalogic™", GE Power Systems, pp. 1-2, printed Dec. 17, 2003.

"Coal Balancing & Blending", GE Power Systems, pp. 1-2, printed Dec. 17, 2003.

"$NO_x$ Reduction", Hamon, pp. 1-2, Dec. 8, 2003.

"Selective Catalytic Reduction (SCR)", Hamon, pp. 1-2, printed Dec. 8, 2003.

"Selective Non-Catalytic Reduction (SNCR)", Hamon, pp. 1-3, printed Dec. 8, 2003.

"SCR SNCR Hybrid System", Hamon, pp. 1-2, Dec. 8, 2003.

"Evaluation of the Effect of SCR NOx Control Technology on Mercury Speciation", Feeley, III et al., Mar. 2003, pp. 1-11.

John H. Pavlish et al., "Status Review Of Mercury Control Options For Coal-Fired Power Plants", pp. 89-165, Fuel Processing Technology 82 (2003).

Thomas D. Brown et al., "Mercury Measurement And Its Control: What We Know, Have Learned, and Need To Further Investigate", Journal of the Air & Waste Management Association, pp. 628-640, vol. 49, Jun. 1999.

Blair A. Folsom et al, "Combustion Modification—An Economic Alternative for Boiler $NO_x$ Control", GE Power Systems, GER-4192, pp. 1-8, Apr. 2001.

R. Sehgal et al., "Intelligent Optimization of Coal Burning to Meet Demanding Power Loads, Emission Requirements, and Cost Objectives", GE Power Systems, GER-4198, pp. 1-14, Oct. 2000.

The Washington Post, "Limiting Mercury Pollution Is Focus of Hot Debate", pp. A3, Mar. 15, 2004.

* cited by examiner

Fig. 7

METHOD FOR OPERATING A REDUCED CENTER BURNER IN MULTI-BURNER COMBUSTOR

RELATED APPLICATION

This application is a divisional of U.S. patent application Ser. No. 10/821,975, filed Apr. 12, 2004, and is incorporated by reference herein in its entirety.

BACKGROUND OF THE INVENTION

The invention relates to a multi-nozzle combustor for a gas turbine and to limiting dynamic flame oscillations in such a combustor.

Industrial gas turbines have a combustion section typically formed by an annular array of combustors. Each combustor is a cylindrical chamber which receives gas and/or liquid fuel and combustion air which are combined into a combustible mixture. The air-fuel mixture burns in the combustor to generate hot, pressurized combustion gases that are applied to drive a turbine.

The combustors are generally dual mode, single stage multi-burner units. Dual mode refers to the ability of the combustor to burn gas or liquid fuels. Single stage refers to a single combustion zone defined by the cylindrical lining of each combustor. Conventional combustors are shown in U.S. Pat. Nos. 5,722,230 and 5,729,968.

Stabilizing a flame in a combustor assists in providing continuous combustion, efficient generation of hot combustion gases and reduced emissions from combustion. The flames of combustion tend to oscillate due to dynamic pressure fluctuations in the combustors especially during combustion transition operations to lean fuel-air mixtures. These oscillations can extinguish the flame in a combustor and fatigue the combustor. There is a long felt need for combustors to have good flame stabilization, combustor performance, and reduced emissions.

BRIEF DESCRIPTION OF THE INVENTION

The invention may be embodied as a single stage combustor for a gas turbine comprising: an annular array of outer fuel nozzles arranged about a center axis of the combustor; a center fuel nozzle aligned with the center axis, wherein the center fuel nozzle is substantially smaller than each of the outer fuel nozzles, wherein said combustor further comprises a pre-mix combustor operating mode in which the center nozzle receives a fuel rich air-fuel mixture as compared to a fuel mixture applied to the outer fuel nozzles, and a diffusion mode wherein the outer fuel nozzles receive a lean fuel-air mixture and the center fuel nozzle receives no more than the lean fuel-air mixture.

The invention may be further embodiment as a single stage combustor for a gas turbine comprising: an annular array of outer fuel nozzles arranged about a center axis, wherein each of said outer fuel nozzle comprises a gaseous fuel passage and a liquid fuel passage, a center fuel nozzle aligned with the center axis and having a fuel passage consisting of at least one gaseous fuel passage, wherein the center fuel nozzle is substantially smaller than each of the outer fuel nozzles, and a pre-mix combustor operating mode in which the center nozzle receives a fuel rich air-fuel mixture as compared to a fuel mixture applied to the outer fuel nozzles.

The invention may be further embodied as a method for combustion in a dual mode, single stage combustor in a gas turbine, wherein said combustor comprises an annular array of outer fuel nozzles arranged about a center axis and a small center fuel nozzle aligned with the center axis, said method comprising: fueling the center fuel nozzle with a fuel-rich mixture of gaseous fuel and air and fueling the outer fuel nozzles with a fuel-lean mixture of fuel and air, wherein a fuel rate applied to the center fuel nozzle and a fuel rate applied to each of the outer fuel nozzles are substantially similar; igniting the fuel-rich mixture injected by the center fuel nozzle while the fuel-lean mixture injected by the outer combustors is insufficient to sustain ignition; stabilizing a flame on the center fuel nozzle while the outer fuel nozzles inject the fuel-lean mixture; staging fuel to the outer nozzles by increasing a fuel ratio of the fuel-lean mixture, and after the outer nozzles sustain ignition, reducing fuel applied to the center nozzle.

DETAILED DESCRIPTION OF THE INVENTION

In a gas turbine having a plurality of combustors, each having an annular array of outer fuel nozzles arranged about a center axis, an improved range of operability (such as flame stability, emissions, peak, fire, turndown, and fuel composition) may be achieved by locating a small-sized center fuel nozzle on the center axis of each combustor and within an annular array of larger outer fuel nozzles. The center fuel injection nozzle is substantially smaller than outer nozzles in a surrounding nozzle array of the combustor. The rate of fuel flow (which may be solely a pre-mixture of gaseous fuel and air) through the center nozzle is substantially less than the fuel flow rate through the larger outer nozzles so as to reduce emissions from the combustor when the center fuel nozzle operates on a fuel-rich mixture.

The small center nozzle provides a flame stabilization structure that creates a flame front anchored by a re-circulation zone in the front face of the center nozzle. The reduced size center fuel injection nozzle provides a pilot flame and recessed bluff body (which forms the recirculation zone) to initiate and stabilize a flame in a combustor, and to reduce the dynamic pressure oscillations that occur in lean dry NOx premix combustion. By reducing oscillations, the center nozzle enhances flame stability. Moreover, the small sized center nozzle has a reduced rate of fuel flow (as compared to the fuel flow through the outer nozzles) to avoid excessive emissions, especially when the center nozzle operates on a fuel rich air-fuel mixture as compared to the fuel mixture flowing to the outer nozzles. The center fuel injection nozzle may also provide improved peak fire turndown and allow for varying fuel composition. Furthermore, the reduced size center nozzle allows the combustor to operate in overall combustor fuel lean conditions that were otherwise not accessible due to dynamic pressure oscillators.

Figure 1:
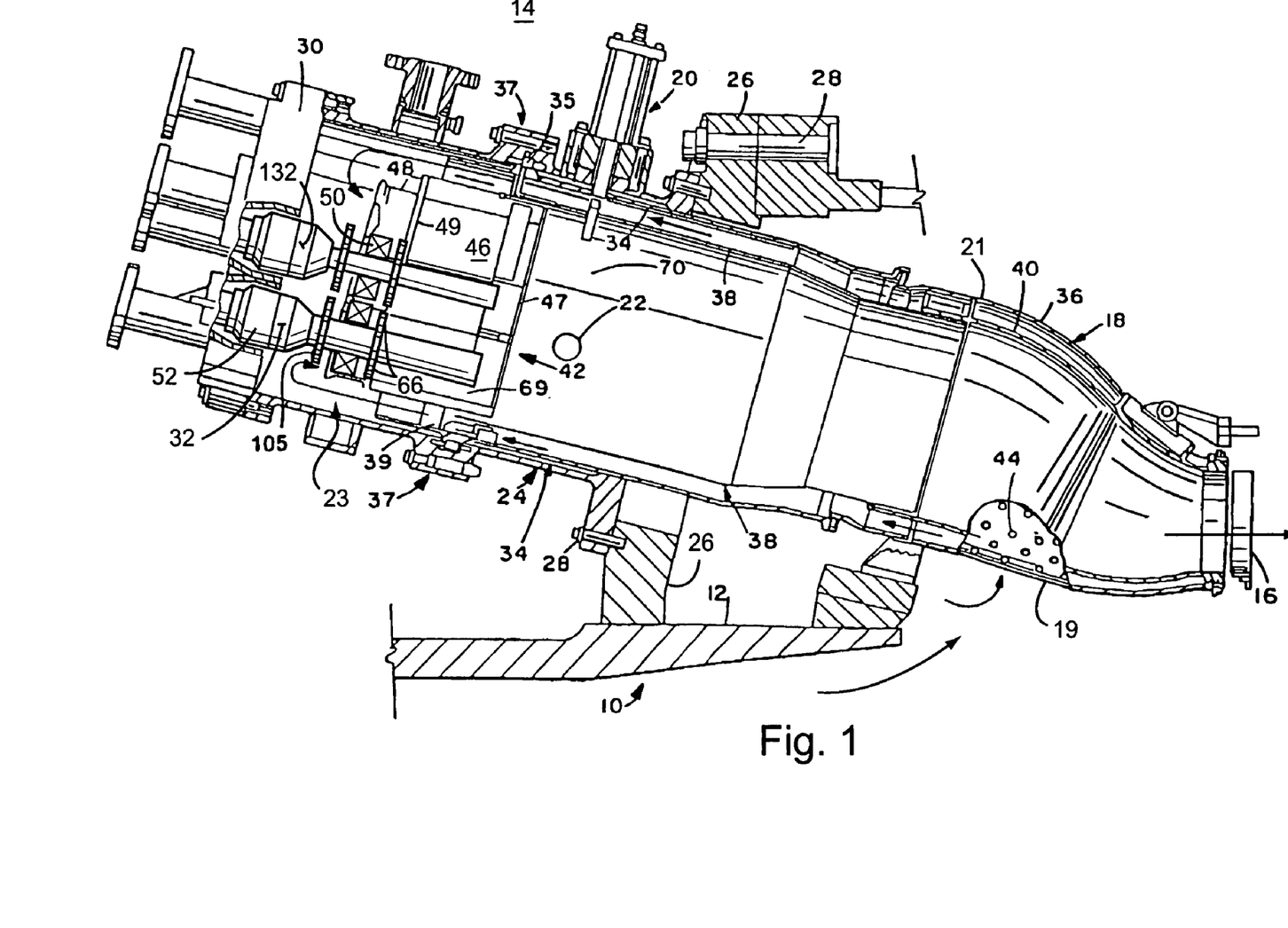
FIG. 1 is a partial section of a dual mode, single stage, multi-burner combustor showing an outer fuel injection nozzle and a smaller center fuel nozzle.

FIG. 1 shows a combustor 14, in partial cross-section, for a gas turbine 10 having a compressor 12 (partially shown), a plurality of combustors 14 (one shown), and a turbine represented here by a single turbine blade 16. The turbine is drivingly connected to the compressor blading along a common axis. Compressor air is reverse flowed to the combustor 14 where it is used to cool the combustor and to provide air to the combustion process.

The gas turbine includes a plurality of combustors 14 arranged in an annular array about the periphery of the gas turbine casing. High pressure air from the compressor 10 flows (see flow arrows in FIG. 1) into the combustor through a compressed air inlet 19 near the outlet end 21 of the combustor. The compressed air flows through an annular passage defined by the combustor flow sleeve 34 and the combustor liner 38 to a combustor inlet end 23 where there is arranged a plurality of air-fuel injectors 32, 132. At the inlet end of each combustor, compressed air and fuel mix and flow into a combustion burning zone 70. Ignition is achieved in the combustors 14 by spark plug(s) 20 in conjunction with cross fire tubes 22 (one shown). At the opposite end of the burning zone, hot combustion gases flow into a double-walled transition duct 18 that connects the outlet end 21 of each combustor with the inlet end of the turbine (see blade 16) to deliver the hot combustion gases to the turbine.

Each combustor 14 includes a substantially cylindrical combustion casing 24 which is secured at an open forward end 19 to the gas turbine casing 26 by bolts 28. The inlet end 21 of the combustion casing is closed by an end cover assembly 30 which may include conventional fuel and air supply tubes, manifolds and associated valves for feeding gas, liquid fuel and air (and water if desired) to the combustor as described in greater detail below. The end cover assembly 30 receives a plurality (for example, five) outer fuel nozzle assemblies 32 arranged in an annular array about a longitudinal axis of the combustor (see FIG. 5). The array of outer fuel nozzle assemblies 32 is arranged around a center fuel nozzle assembly 132 that is small (in terms of size and fuel flow) relative to the outer nozzle assemblies 32.

A substantially cylindrical flow sleeve 34 is concentrically mounted in the casing 24. The flow sleeve connects at its forward end to the outer wall 36 of a double walled transition duct 18. Compressor air flows through the duct 18, over and through the flow sleeve, and to the inlet end 21 of the combustor. The flow sleeve 34 is connected at its rearward end by means of a radial flange 35 to the combustor casing 24 at a butt joint 37 where fore and aft sections of the combustor casing 24 are joined.

Figure 5:
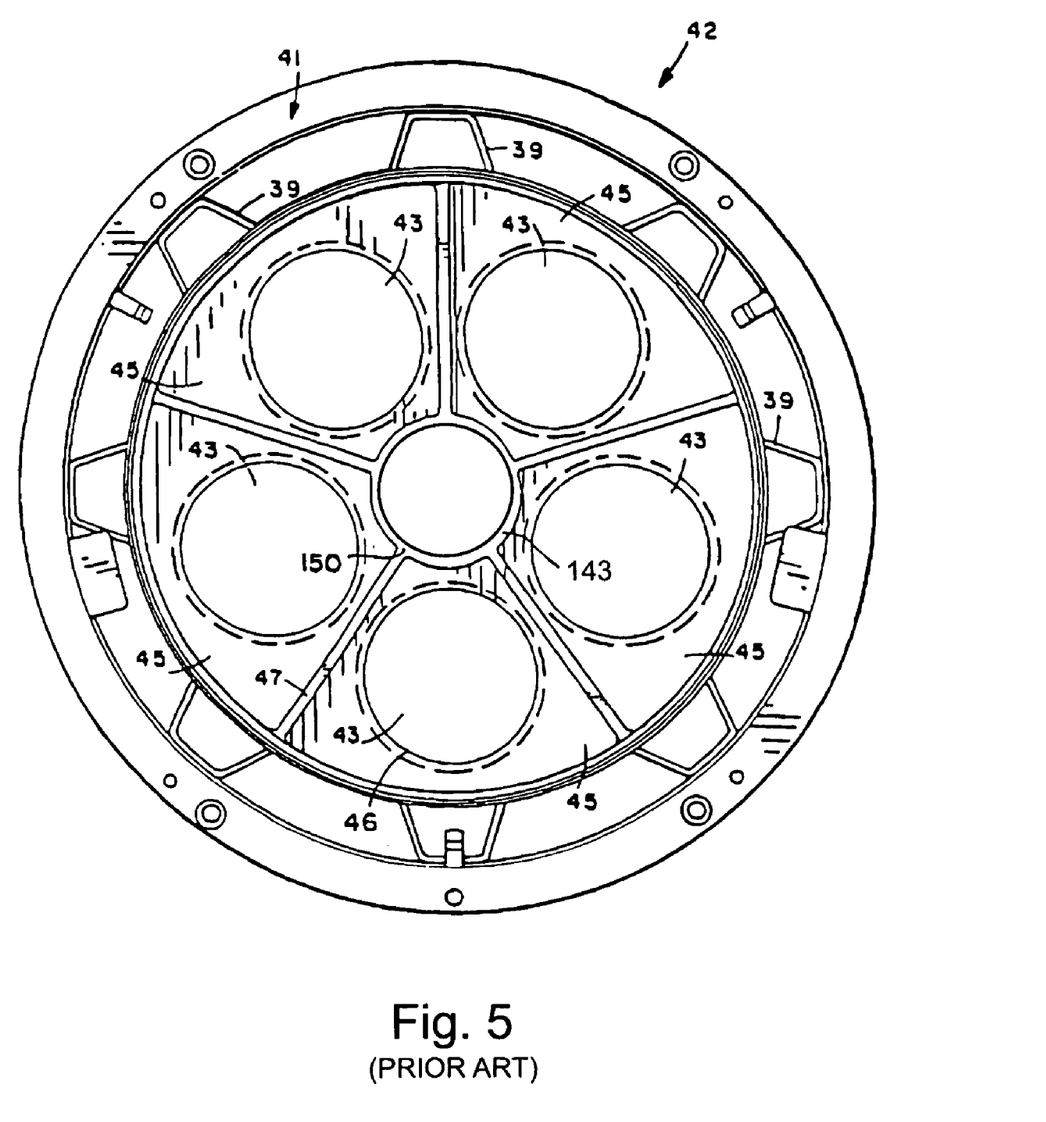
FIG. 5 is a simplified end view of a multi-burner combustor of the type shown in FIG. 2.

The flow sleeve 34 is concentrically arranged with a combustion liner 38 which is connected at one end with the inner wall 40 of the transition duct 18. The opposite end of the combustion liner 38 is supported by a combustion liner cap assembly 42 which is, in turn, supported within the combustor casing by a plurality of struts 39 and associated mounting flange assembly 41 (FIG. 5). The outer wall 36 of the transition duct 18, as well as that portion of flow sleeve 34 extending forward of the location where the combustion casing 24 is bolted to the turbine casing are formed with an array of apertures 44 over their respective peripheral surfaces to permit air to reverse flow from the compressor 12 through the apertures 44 into the annular space between the flow sleeve 34 and the liner 38 toward the upstream or rearward end of the combustor (as indicated by the flow arrows shown in FIG. 1).

The combustion liner cap assembly 42 supports a plurality of pre-mix tubes 46, one for each fuel nozzle assembly 32, 132. Each pre-mix tube 46 is supported within the combustion liner cap assembly 42 at its forward and rearward ends by front and rear plates 47, 49, respectively, each provided with openings aligned with the open-ended pre-mix tubes 46. This arrangement is best seen in FIG. 5, with openings 43 (for nozzle 32 and their premix tube), 143 (for nozzle 132 and its premix tube) shown in the front plate 47. The front plate 47 (such as an impingement plate provided with an array of cooling apertures) may be shielded from the thermal radiation of the combustor flame by shield plates 45.

The rear plate 49 mounts to a plurality of rearwardly extending floating collars 48 (one for each pre-mix tube 46, arranged in substantial alignment with the openings in the rear plate), each of which supports an air swirler 50 in surrounding relation to a corresponding fuel nozzle assembly 32, 132. The arrangement is such that air flowing in the annular space between the liner 38 and flow sleeve 34 is forced to reverse direction at the combustor inlet end 23 of the combustor (between the end cover assembly 30 and liner cap assembly 42) and to flow through the swirlers 50 and pre-mix tubes 46 before entering the burning zone 70 within the liner 38, downstream of the pre-mix tubes 46.

Figure 2:
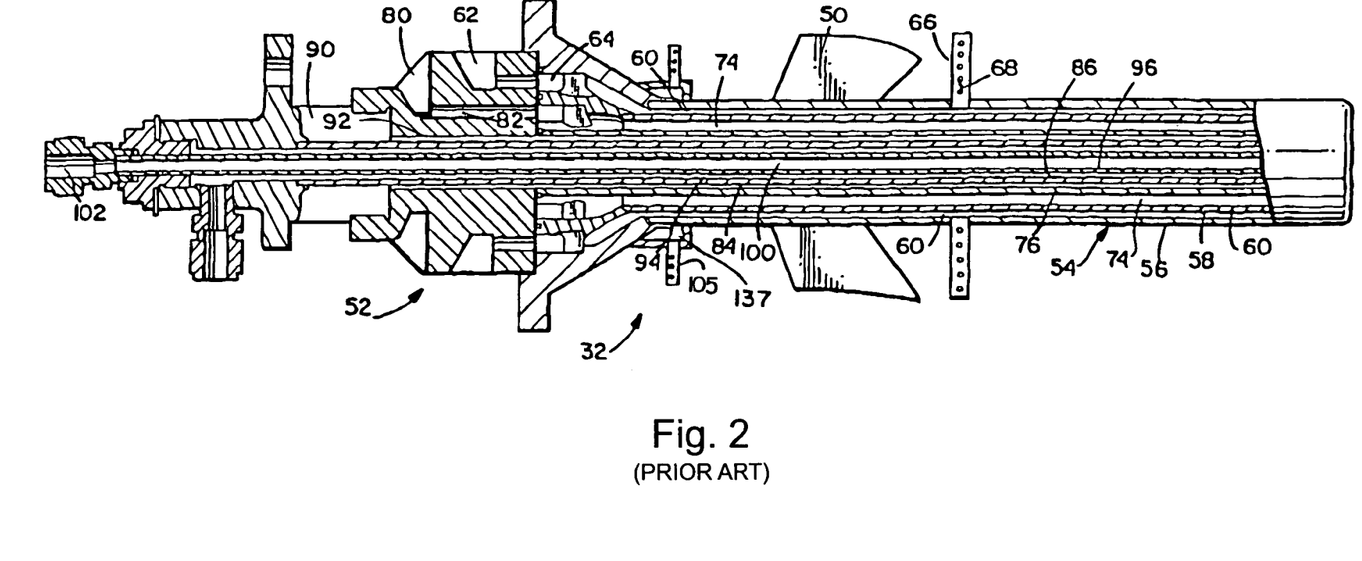
FIG. 2 is a sectional view of a fuel injection nozzle, such as either or both the outer and center fuel nozzle shown in FIG. 1.
Figure 3:
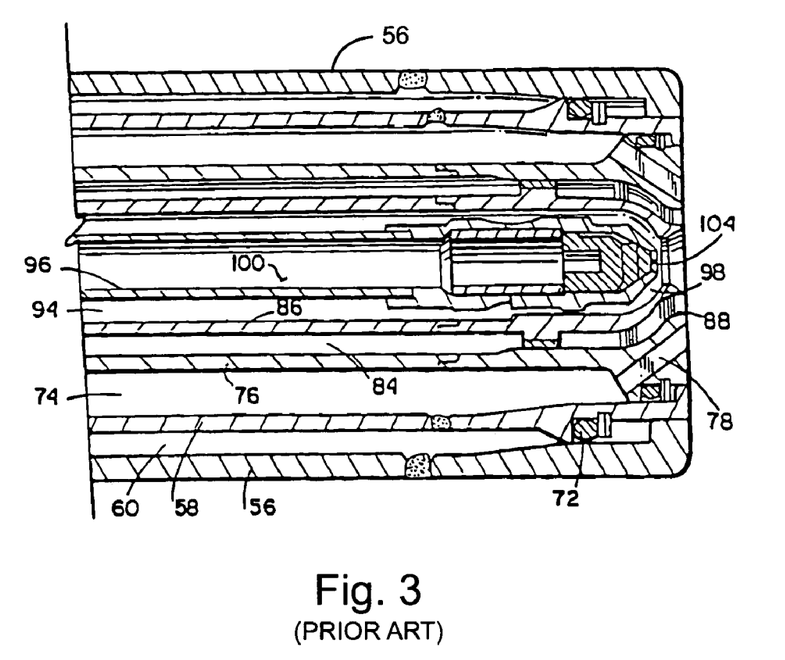
FIG. 3 is an enlarged end partial cross-sectional view of the nozzle shown in FIG. 2.
Figure 4:
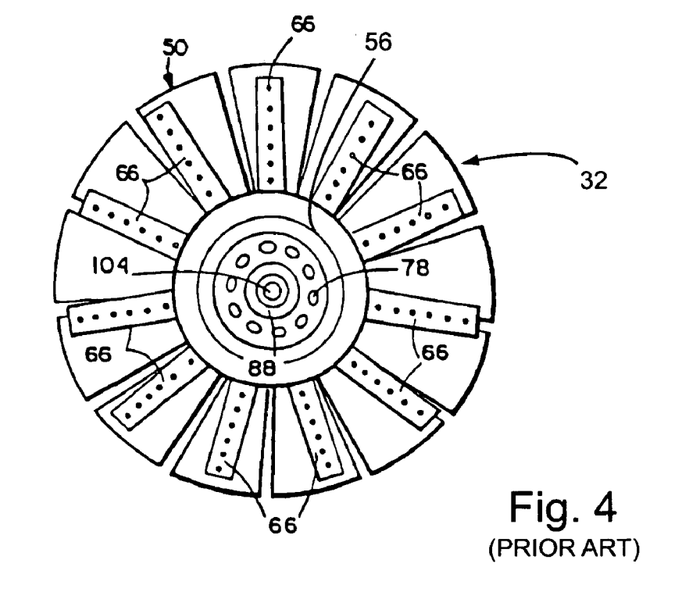
FIG. 4 is a front end view of the nozzle shown in FIG. 2.

FIGS. 2, 3, and 4 show an exemplary conventional fuel nozzle assembly 32 that includes a rearward supply section 52 with inlets for receiving liquid fuel, atomizing air, diffusion gas fuel and pre-mix gas fuel. The fuel nozzle assembly shown in FIGS. 2, 3 and 4 is most suitable for the outer nozzles 32. It may also be used as a center nozzle 32, in a scaled down form. The fuel nozzle assembly includes suitable connecting passages for supplying these fluids to a respective passage in a forward delivery section 54 of the fuel nozzle assembly. The forward delivery section 54 of the fuel nozzle assembly is comprised of a series of concentric tubes.

In the fuel nozzle 32, the two radially outermost concentric tubes 56, 58 provide a pre-mix gas passage 60 which receives pre-mix gas fuel from an inlet 62 connected to fuel passage 60 by means of conduit 64. The pre-mix gas passage 60 also communicates with a plurality (for example, eleven) radial fuel injectors spokes 66, each of which is provided with a plurality of fuel injection ports or holes 68 for discharging gas fuel into a pre-mix zone 69 (FIG. 1) located within the pre-mix tube 46. The injected fuel mixes with air reverse flowed from the compressor 12, and swirled by means of the annular swirler 50 surrounding the fuel nozzle assembly upstream of the radial injectors 66. The pre-mix passage 60 is sealed by an O-ring 72 (FIG. 3) at the forward or discharge end of the fuel nozzle assembly, so that pre-mix fuel may exit only via the radial fuel injectors 66.

The next adjacent passage 74 is formed between concentric tubes 58 and 76, and supplies diffusion gas to the burning zone 70 (FIG. 1) of the combustor via orifice 78 (FIG. 3) at the forwardmost end of the fuel nozzle assembly 32, 132. The forwardmost (or discharge) end of the nozzle is located within the pre-mix tube 46, but relatively close to the forward end thereof. The diffusion gas passage 74 receives diffusion gas from an inlet 80 via conduit 82.

A third passage 84 is defined between concentric tubes 76 and 86, and supplies atomizing air to the burning zone 70 via orifice 88 where it then mixes with diffusion fuel exiting the orifice 78. The atomizing air is supplied to passage 84 from an inlet 90 via conduit 92.

The fuel nozzle assembly 32 is also provided with an optional water passage 94 for supplying water to the burning zone 70 to effect NOx reductions in a manner understood by those skilled in the art. The water passage may be included in the outer fuel nozzles and not included in the center fuel nozzle. The water passage 94 is defined between tube 86 and adjacent concentric tube 96. Water exits the nozzle via an orifice 98, radially inward of the atomizing air orifice 88.

Tube 96, the innermost of the series of concentric tubes forming the fuel injector nozzle, forms a central passage 100 for liquid fuel which enters the passage by means of inlet 102. The liquid fuel exits the nozzle by means of a discharge orifice 104 in the center of the nozzle. The liquid fuel capability may be provided as a back-up system. Passage 100 may be normally shut off while the gas turbine is in its normal gas fuel mode.

Figure 6:
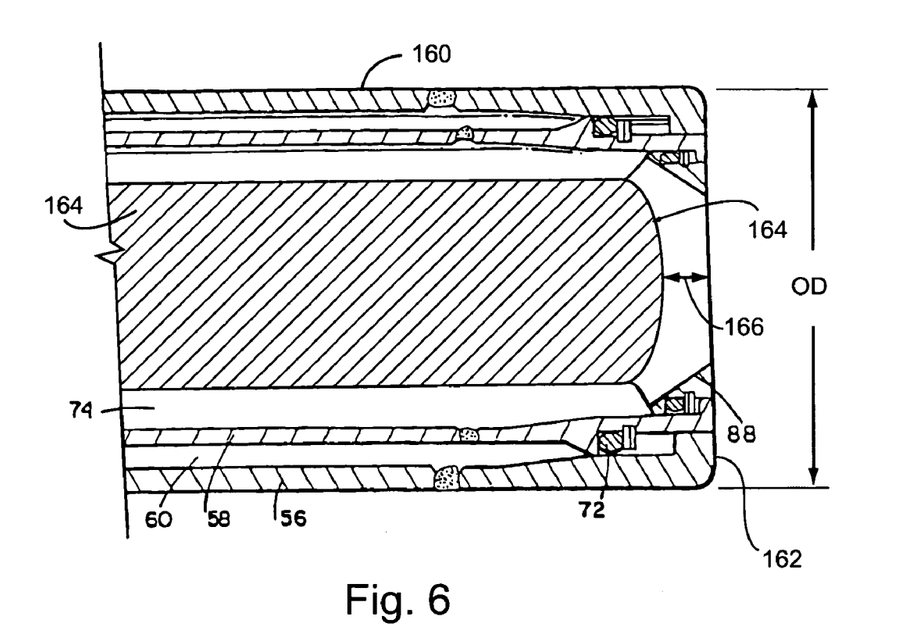
FIG. 6 is an enlarged partial cross-sectional view of a second embodiment of a center fuel nozzle.
Figure 7:
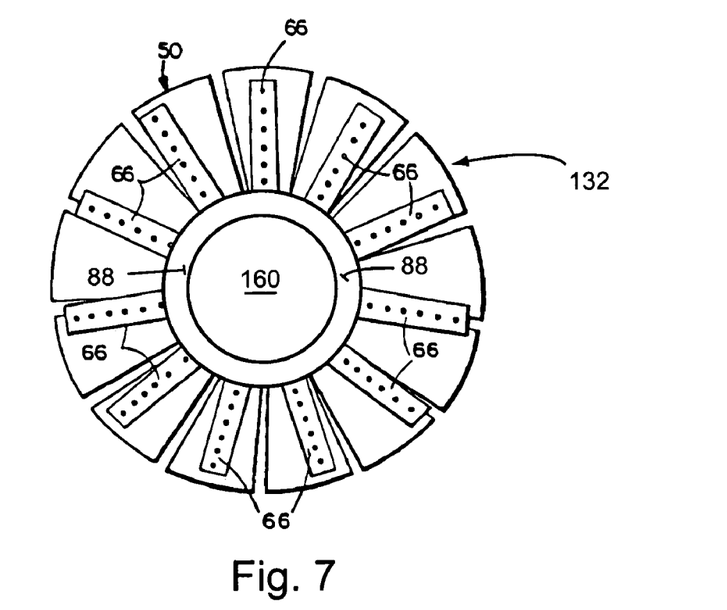
FIG. 7 is a simplified end view of a multi-burner combustor of the type shown in FIG. 6.

FIGS. 6 and 7 show an enlarged cross-sectional view and end view of a center fuel nozzle 132 that is smaller and has fewer passages than the outer fuel nozzle 32 (shown in FIGS. 2, 3 and 4). The center nozzle may be structurally similar to the outer fuel nozzle assemblies 32, except that the center nozzle (may not have passages (or their associated tubes) for water (see passage 94 in FIG. 3), liquid fuel (see central passage 100), or air (see passage 84).

The center nozzle 132 may include a bluff body 160 formed at the nozzle discharge face and recessed, e.g., by one and one half inches, from the outer lip 162 of the outer nozzle tube 56. The bluff body may be formed from the end of cylinder 164 that is coaxial to the other tubes 56 and 58. Immediately downstream of the bluff body is formed an aerodynamic stagnant zone which stabilizes combustion of the fuel mixture from the center nozzle. The center nozzle 132 includes a gas fuel passage 60 similar to he passage 60 shown in FIGS. 2, 3 and 4 and having an associated radial fuel injector. The center nozzle also includes a diffusion gas passage 74 similar to the passage 74 shown in FIGS. 2, 3 and 4. The recessed bluff body 160 and tube lip 162 define a flame recirculation zone 166 to stabilize a flame in front of the center nozzle.

The combustor functions in a dual mode, single stage manner. However, center nozzle 132 as shown in FIG. 6 does not operate on liquid fuel. At low turbine loads, diffusion gas fuel is fed to each nozzle 32, 132 and dedicated pre-mix tube assembly 46 through inlet 80, conduit 82 and passage 74 for discharge via orifice 78 into the combustion zone 70 of the combustor. In burning zone 70, the diffusion gas mixes with atomizing air discharged from passage 84 via orifice 88. The mixture of atomizing air and diffusion gas is ignited by the spark plug 20 and burned in the combustion zone 70 within the liner 38. At higher turbine loads, pre-mix gas fuel is supplied to passage 60 via inlet 62 and conduit 64 for discharge through orifices 68 in radial injectors 66. The pre-mix fuel mixes with air entering the pre-mix tube 46 by means of swirlers 50, the mixture igniting by the pre-existing flame in burning zone 70 in liner 38. During pre-mix operation, fuel to the diffusion passage 74 is shut down.

Referring again to FIGS. 1 and 2, there are provided a plurality of circumferentially spaced, radially extending fuel injector pegs 105 upstream of the swirlers 50 for each nozzle. As illustrated in FIG. 2, the pegs 105 lie in communication with a manifold 137 about the outer tube 56 of each nozzle. Pre-mix fuel is supplied to manifold 137 for injection into the reverse flow of air from the compressor for flow with the air through the swirler and past the downstream injectors 66. The two axial locations for injection of the pre-mix fuel are upstream and downstream of the swirlers 50.

The center pre-mix tube 150 (see FIG. 5), and center fuel nozzle 132 (see FIGS. 1 and 5) are located on the center axis of the combustor in opening 107 (see FIG. 5), and surrounded concentrically by an annular array of nozzle assemblies 32. The center pre-mix tube 150 is supported within the combustion liner cap assembly 42 at its forward and rearward ends by front and rear plates 47 and 49 respectively, with opening 107 aligned with center pre-mix tube 150.

The outer diameter (OD) of the center nozzle assembly 132 may be 85% or less than the OD of an outer fuel injection nozzle 32. The center fuel nozzle 132 may operate as a premix pilot burner that receives a rich fuel-air mixture as compared to the mixture received by the outer nozzles 32, at least during a combustor transition to a lean low NOx combustion condition. The center nozzle 132 stabilizes the flame in the combustion zone 70, especially during certain transition operations when flame pressure oscillations tend to be severe in the burning zone. For example, a rich air-fuel mixture may be supplied to the center nozzle 132 to anchor a flame just downstream of the center nozzle in the burning zone 70. At the same time, the fuel-air mixture applied to the outer nozzles 32 may be excessively lean and inadequate to independently support combustion. As the fuel-air mixture to the outer fuel nozzles transitions to a combustible mixture the flame anchored by the center nozzle propagates axisymmetrically to the outer nozzles. In this way the fuel is staged from the center nozzle to the outer nozzles to the combustor to a lean fuel-air mixture. The fuel staging from the center nozzle to the outer nozzle may be performed axisymmetrically to control the propagation of the flame from the center nozzle 132 to the outer nozzle 32. When the outer nozzles are operating stably with a lean-mixture, the center nozzle 132 may also be operated at the same lean mixture.

The reduced size of the center fuel nozzle assembly 132 results in relatively smaller fuel flow through the center nozzle assembly as compared to the fuel flowing through one of the larger outer fuel nozzle assemblies 32 though the fuel-air ratio may be higher. The fuel flow through a center fuel nozzle assembly may be 80% to 95% of the fuel flow through one of the outer fuel nozzle assemblies at the low emissions baseload design point. The center nozzle 132 thus has limited adverse impact on emission levels even when the center nozzle operates at a rich air-fuel mixture.

In full pre-mixed mode (all six nozzles fueled), the presence of the center nozzle 132 allows turndown of the combustor to a lower temperature, and hence lower load, than is possible without the center nozzle, while still maintaining low NOx, CO and UHC emissions. The extended turndown in pre-mixed operation is achieved as described below.

During high temperature operation, low NOx emissions are achieved by maintaining the same fuel/air ratio in all nozzles, both center nozzle 132 and outer nozzles 32. The proportion of fuel to the center nozzle will be the same as its proportion of total burner air flow. At constant air flow, as total fuel is reduced while still maintaining equal fuel/air ratio in all nozzles, the nozzles begin to approach a lean blow-out limit.

The use of the center nozzle 132 also improves flame stability for low load operation. Typically, operation between full speed, no load and 40% of load occurs with some or all of the outer nozzles running in diffusion mode. At very low loads in diffusion mode, the low fuel/air ratio in the outer nozzles 32 makes the flame unstable and prone to blow-out. By running rich nozzle 132 at full speed, no-load (FSNL) the center conditions, in either diffusion or pre-mixed mode, the flame stability can be greatly enhanced. As the load is increased, fuel can be gradually added to the outer nozzles 32, in stages, or to all nozzles at once. Even when the fuel/air ratio in the outer nozzles is very lean, a high fuel/air ratio in the center nozzle 132 can be used to maintain flame stability and provide an ignition source for the fuel in the outer nozzles 32.

The reduced size center nozzle 132 has good flame stabilization that limits dynamic oscillations and enhances the combustor capability to run with reduced emissions. The small center nozzle 132 also allows for increased firing temperatures with low combustion pressure dynamics; reduces the need for additional fuel circuits to manage high fuel temperatures; increases the range of acceptable fuel compositions/temperatures (as expressed by the Modified Wobbe Index); expands the range of load turndown with acceptable emissions; increases system reliability by providing a common method of flame stabilization from no-load to full-load (mode transfer robustness). The above-described procedure that has been developed allows the center nozzle in a multi-nozzle combustor to be transitioned to and operated with a single (center-body) or dual-concentric (center-body and burner tube) flame front, in a manner that creates a central axis-symmetric flame front stabilization point.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for combustion in a combustor in a gas turbine, wherein said combustor comprises an annular array of outer fuel nozzles arranged about a center axis and a small center fuel nozzle aligned with the center axis, and a bluff body associated with the center fuel nozzle, said method comprising:
   a. fueling the center fuel nozzle with a fuel-rich mixture of gaseous fuel and air and fueling the outer fuel nozzles with a fuel-lean mixture of fuel and air;
   b. igniting the fuel-rich mixture injected by the center fuel nozzle while the fuel-lean mixture injected by the outer fuel nozzles is insufficient to sustain ignition;
   c. stabilizing a flame on the center fuel nozzle using the bluff body and while the outer fuel nozzles inject the fuel-lean mixture;
   d. staging fuel to the outer nozzles by increasing a fuel ratio of the fuel-lean mixture, and
   e. after the outer nozzles sustain ignition, reducing the fuel applied to the center nozzle.

2. A method as in claim 1 wherein the outer nozzles and center nozzles operate on substantially similar fuel-air mixtures after step (e).

3. A method as in claim 1 wherein step (b) is performed with a premix gas fuel injected by the center nozzle and steps (c) and (d) are preformed with a diffusion gas injected by the outer fuel nozzles.

4. A method as in claim 1 wherein the bluff body is recessed within the center nozzle.

5. A method as in claim 1 wherein the bluff body is coaxial within the center nozzle.

6. A method as in claim 1 wherein the fuel mixture applied to the center fuel nozzle during step (e) and the fuel mixture applied to each of the outer fuel nozzles during step (e) are substantially similar.

7. A method as in claim 1 wherein the flame is at least partially stabilized by the center nozzle, wherein the center nozzle further comprises an outer tube.

8. A method as in claim 7 wherein an end lip of the outer tube is extended to form a recirculation zone for a flame front adjacent an end of the center nozzle and said recirculation zone assists in the stabilization of the flame.

9. A method as in claim 1 wherein the center nozzle includes fuel passages comprising a premix gas fuel passage and a diffusion gas passage, and said outer fuel nozzles each include fluid passages comprising a premix gas fuel passage and a diffusion gas passage, and said method further comprises operating the center nozzle and outer fuel nozzles in a pre-mix combustor operating mode in which the center nozzle receives a fuel rich air-fuel mixture as compared to a fuel mixture applied to the outer fuel nozzles, and a diffusion operating mode wherein the outer fuel nozzles receive a lean fuel-air mixture and the center fuel nozzle receives no more than the lean fuel-air mixture.

10. A method for combustion in a combustor in a gas turbine, wherein said combustor comprises an annular array of outer fuel nozzles arranged about a center axis and a small center fuel nozzle aligned with the center axis, and a bluff body along a center axis of the center fuel nozzle, said method comprising:
   a. fueling the center fuel nozzle with a fuel-rich mixture of gaseous fuel and air and fueling the outer fuel nozzles with a fuel-lean mixture of fuel and air;
   b. igniting the fuel-rich mixture injected by the center fuel nozzle into a combustion burning zone of the combustor, while the fuel-lean mixture injected into the zone by the outer fuel nozzles is insufficient to sustain ignition;
   c. stabilizing a flame in the zone downstream of the center fuel nozzle using the bluff body and while the outer fuel nozzles inject the fuel-lean mixture;
   d. after stabilizing the flame, staging fuel to the outer nozzles by increasing a fuel ratio of the fuel mixture injected by the outer fuel nozzles, and
   e. after the outer nozzles sustain ignition, reducing the fuel applied to the center nozzle.

11. A method as in claim 10 wherein the outer nozzles and center nozzles operate on substantially similar fuel-air mixtures after step (e).

12. A method as in claim 10 wherein step (b) is performed with a premix gas fuel injected by the center nozzle and steps (c) and (d) are preformed with a diffusion gas injected by the outer fuel nozzles.

13. A method as in claim 10 wherein the bluff body is recessed within the center nozzle.

14. A method as in claim 10 wherein the bluff body is coaxial within the center nozzle.

15. A method as in claim 10 wherein the reduced fuel mixture applied to the center fuel nozzle during step (e) and the fuel mixture applied to each of the outer fuel nozzles during step (e) are substantially similar.

16. A method as in claim 10 wherein the flame is at least partially stabilized by the center nozzle, and the center nozzle further comprises an outer tube.

17. A method as in claim 16 wherein an end lip of the outer tube is extended to form a recirculation zone for a flame front downstream of the center nozzle and said recirculation zone assists in the stabilization of the flame.

18. A method as in claim 10 wherein the center nozzle includes fuel passages comprising a premix gas fuel passage and a diffusion gas passage, and said outer fuel nozzles each include fluid passages comprising a premix gas fuel passage and a diffusion gas passage, and said method further comprises operating the center nozzle and outer fuel nozzles in a pre-mix combustor operating mode in which the center nozzle receives a fuel rich air-fuel mixture as compared to a fuel mixture applied to the outer fuel nozzles, and subsequently in a diffusion operating mode wherein the outer fuel nozzles receive a lean fuel-air mixture and the center fuel nozzle receives no more than the lean fuel-air mixture applied to the outer fuel nozzles.

19. A method as in claim 10 further comprising operating the center nozzle and outer fuel nozzles in a diffusion operating mode in which the center nozzle receives a lean fuel air-fuel mixture.

20. A method as in claim 10 further comprising operating the center nozzle and outer fuel nozzles in a diffusion operating mode wherein the outer fuel nozzles receive a lean fuel-air mixture and the center fuel nozzle receives no more than the lean fuel-air mixture.

* * * * *